United States Patent [19]

Wald

[11] Patent Number: 4,993,348

[45] Date of Patent: Feb. 19, 1991

[54] APPARATUS FOR HARVESTING ENERGY AND OTHER NECESSITIES OF LIFE AT SEA

[76] Inventor: Leonard H. Wald, 679 Tiffany Ct., Sunnyvale, Calif. 94087

[21] Appl. No.: 296,866

[22] Filed: Jan. 13, 1989

Related U.S. Application Data

[63] Continuation-in-part of Ser. No. 87,469, Aug. 20, 1987, abandoned.

[51] Int. Cl.$^5$ ............................................... B63B 1/12
[52] U.S. Cl. ..................................... 114/265; 114/256; 114/61
[58] Field of Search ................... 114/56, 61, 256, 271, 114/274, 275, 277, 284, 312, 313, 330–333

[56] References Cited

U.S. PATENT DOCUMENTS

| | | | |
|---|---|---|---|
| 1,697,574 | 1/1929 | Savonius | 416/110 |
| 1,820,529 | 12/1931 | Darrieus | 416/238 |
| 1,835,018 | 12/1931 | Darrieus | 416/111 |
| 3,183,871 | 5/1965 | Reder | 114/332 |
| 3,356,056 | 12/1967 | Lehmann | 114/332 |
| 3,738,304 | 6/1973 | Duberly | 114/126 |
| 3,797,433 | 3/1974 | Schirtzinger | 114/16 R |
| 3,868,920 | 3/1975 | Schirtzinger | 114/332 |
| 3,986,471 | 10/1976 | Haselton | 114/0.5 D |
| 4,095,547 | 6/1978 | Benington | 114/125 |
| 4,228,788 | 10/1980 | Moeser | 114/125 |
| 4,276,849 | 7/1981 | Bloxham | 114/125 |
| 4,279,124 | 7/1981 | Schremp | 60/505 |
| 4,290,229 | 9/1981 | Miura | 47/66 |
| 4,345,533 | 8/1982 | Kunitake | 114/61 |
| 4,359,868 | 11/1982 | Slonim | 60/501 |
| 4,371,346 | 2/1983 | Vidal | 440/8 |
| 4,379,375 | 4/1981 | Eisenberg et al. | 47/65 |
| 4,421,050 | 12/1983 | Weinert | 114/256 |
| 4,440,103 | 4/1984 | Lang | 114/61 |
| 4,452,166 | 6/1984 | Daniel | 114/61 |
| 4,549,267 | 10/1985 | Drabouski | 114/125 |
| 4,552,083 | 11/1985 | Schimdt | 114/61 |
| 4,557,211 | 12/1985 | Schmidt | 114/61 |
| 4,561,370 | 12/1985 | Sanford | 114/125 |
| 4,602,584 | 7/1986 | North | 114/103 |
| 4,615,292 | 10/1986 | Laukien | 114/61 |

*Primary Examiner*—Joseph F. Peters, Jr.
*Assistant Examiner*—Clifford T. Bartz

[57] ABSTRACT

A vessel is provided, adapted for operating at the surface of the ocean, useful for a combination of functions, including providing food, fiber for clothing, living space, fresh water, transportation, and domestic energy for at least one person, as well as excess energy, food, fiber and fresh water for sale. The vessel comprises at least two hulls coupled with streamlined struts, the upper hull vertically aligned with the lower, the lower hull being fully submerged and the upper hull being fully unsubmerged, and both hulls having substantially the same volume. The vessel is stabilized by a combination of passive lift and stabilization surfaces while the vessel is in motion, and laterally mounted stabilization reservoirs for use when the vessel is not moving. The vessel is controlled and stabilized against wave-generated motion by a combination of actively controllable moveable surfaces, and is propelled by a sail and a water propellor. A combination of energy harvesting means is mounted on the vessel, including a sail augmented wind tubine, a water wave tubine, and a combination of concentrating and flat panel solar radiant energy collectors. Means is provided for converting the harvested energy into a storable form (hydrogen and oxygen) for later use or sale. Shelter is provided within the vessel for all daily living activities of an individual or a family. Means is provided for growing land food crops as well as sea food products for support of an individual or a family.

18 Claims, 8 Drawing Sheets

APPARATUS FOR HARVESTING ENERGY AND OTHER NECESSITIES OF LIFE AT SEA

This Application is a Continuation-In-Part of Ser. No. 07/087,469 filed Aug. 20, 1987 and now abandoned.

BACKGROUND—FIELD OF THE INVENTION

This invention relates to the production of the necessities of life by a seagoing vessel and coupled apparatus hereinafter called a SEMAN (Seagoing Energy Module with Automatic Navigation-stabilization). Specifically, it relates to the production of energy, food, fiber for clothing, fresh water, shelter, and transportation, which is used to provide a living for at least one person. In addition, this invention relates to seagoing vessels, hereinafter called modules, which are resistant to wave generated oscillation, offer reduced resistance to motion and do not disturb natural waves. Specifically, it relates to passive wave motion stabilization and motion resistance reduction techniques which depend on hull shape, as well as active stabilization and direction control techniques which use moveable control surfaces.

BACKGROUND—CROSS REFERENCE TO RELATED APPLICATIONS

The vessel and attached apparatus described in this specification uses one or more of the processes described in a related patent application "Methods for Harvesting Energy and Other Necessities of Life at Sea", Ser. No. 07/224,180, filed July 25, 1988; now abandoned, which is a Continuation-In-Part of Ser. No. 07/087,463, filed Aug. 20, 1987; now abandoned. These methods are processes which place a SEMAN in high energy Zones of the sea a high percentage of the time so that it can operate profitably.

BACKGROUND—DISCUSSION OF PRIOR ART

Heretofore, the sea has been used primarily for fishing, recreational boating, and the transportation of people and goods. This use ignores the enormous amount of unused energy available on the sea in the form of wind, wave and solar radiation, as well as the huge area available for human habitation.

Some prior attempts have been made to use sea energy to augment and eventually replace the world oil supply (Reference U.S. Pat. Nos. 4,371,346, 4,359,868, and 4,279,124) since it is a plentiful source, and environmentally safe. These attempts have met with little economic success, however, because the capital cost per unit energy output is too high in most geographic areas to be competitive with oil, coal, and nuclear energy. Similarly, prior attempts to use hydroponics on land or sea, to provide an increase in the world's limited food supply (Reference U.S. Pat. Nos. 4,290,229 and 4,379,375) have also met with little economic success because the capital, energy, and labor costs per unit food output are too high to be competitive with large, efficient land-based farms. No prior effort to grow plankton and then feed them to fish for commercial sale is known.

One of the obstacles that has kept people from harvesting sea energy, growing food on the sea, and using the sea for living space, is the lack of mobile, seagoing, energy harvesting modules that are stable in the sense that they are not disturbed by nor do they disturb waves. Wave stabilized modules are useful for living comfort and food crop growth. They are also useful in providing platforms for wave energy harvesting equipment if they do not disturb the waves. It is especially important that these modules be efficiently mobile in quiet seas and capable of operating well in rough seas. The energy which would be the primary product of a SEMAN comes largely from wind and waves in rough seas, and efficient transport from one area of rough seas to another would be required. Passively stabilized, fixed modules that are relatively insensitive to waves have been patented (Reference U.S. Pat. No. 3,986,471), as well as actively stabilized vessels (Reference U.S. Pat. Nos. 3,797,433 and 3,738,304), but none are useful for this application. The passive, fixed, stable vessel is not suitable because of immobility. The active, mobile vessel is not suitable because it disturbs waves, because it requires considerable energy to stabilize due to the large displacement-generated wave driven moments, and because considerable energy is required to overcome wave resistance. No mobile, seagoing module that combines the best characteristics of both wave stabilization systems has yet been patented.

OBJECTS AND ADVANTAGES

The SEMAN described in this disclosure is a seagoing vessel with attached apparatus which provides all of the primary living requirements (food, fresh water, fiber for clothing, shelter, transportation and energy) as well as profits from the sale of energy to pay for the SEMAN and for secondary living requirements (fertilizer, lubricants and repair parts) when used with appropriate SEMAN operation modes. Thus the SEMAN and its Operation Modes meet a need in the modern world for:

Environmentally safe energy to augment and eventually replace the world oil supply,
An increase in the world's limited food, clothing, and fresh water supply,
Homes which do not occupy scarce and valuable land real estate for the growing world population,
Inexpensive energy-efficient transportation.

These four items are the objects of this invention.

A SEMAN can be economically viable in both energy and food production if it can follow high-energy areas of the sea and, at the same time, cover many expenses of the operator with one basic capital cost. This disclosure describes the characteristics of the SEMAN which allow it to generate energy and cover the principal expenses of the SEMAN operator with one cost. In addition, this disclosure describes the characteristics of the vessel which make it useful as a home and a convenient mode of transportation.

A mass-produced SEMAN (exclusive of the energy generation and storage equipment) is designed to cost roughly the same as a medium-sized house and it takes over that function for the operator. It is sized to be capable of generating enough stored energy to gay for: the SEMAN loan payments, the amortization of the energy generation and storage equipment, replacement parts, lubricants and fertilizer, and still provide a profit for the operator. The profit, though small, is acceptable because the SEMAN provides a house to live in, domestic energy, transportation, food, fiber for clothing, and fresh water for the SEMAN operator and dependents. The operator, in return, provides maintainance for the SEMAN, its energy harvesting equipment, and its energy storage equipment. Profitable operation is possible, however, only if a procedure exists which allows the SEMAN to operate in a high energy environment—15 knot winds or greater, and 4 foot waves or greater—a high percentage of the time. The methods of operation of the SEMAN described in the above-mentioned related patent give this procedure.

The SEMAN consists of the following components:
1. A stabilized, self-propelled, seagoing module
2. Energy gathering, generating, and storage equipment
3. Land food crop growing equipment
4. Sea food crop growing equipment The seagoing module, the overall SEMAN and each component will be described in the sections below.

2—Two lower hulls, which provide the displacement necessary to support the module. They normally operate submerged and contain sea crop growing tanks, energy generation and storage equipment, and propulsion equipment.

4—An upper hull, with at least two decks. The family living quarters are on the second deck. The land crop growing tanks are on the top deck.

6—Struts, which connect the upper hull with the lower hull without providing significant displacement.

8—A sea-stabilizer and sea-elevator which provide pitch stability and control.

10—A central sea-wing and sea-flap which provide lift and vertical control.

12—Two outer sea-wings and sea-ailerons which provide roll stability and control.

14—One or more sea-fins with connecting sea-rudders which provide yaw stability and control.

16—Two sea-wing tip floats which provide zero speed stabilization near the surface.

18—A propellor to provide propulsion.

Figure 1:
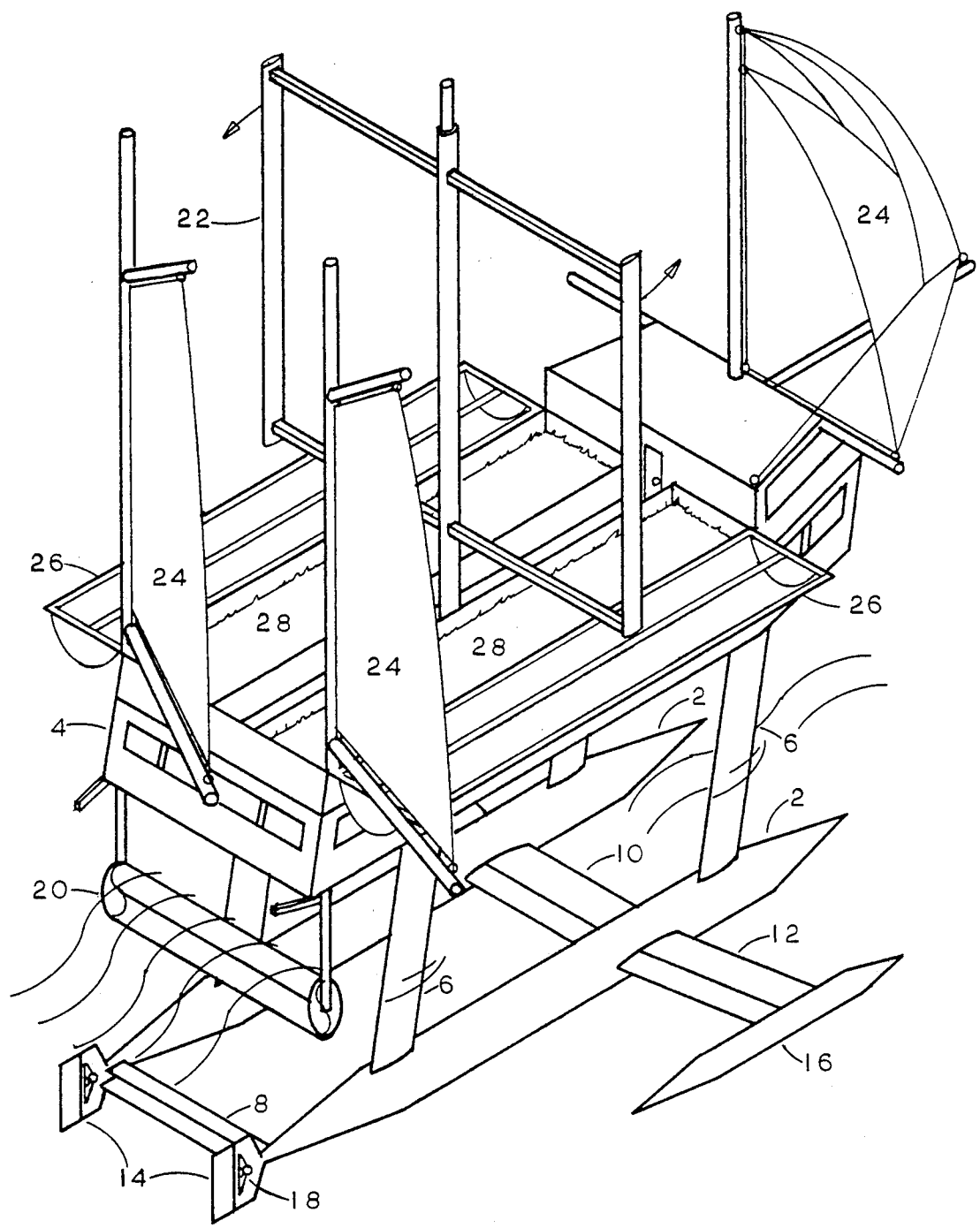
FIG. 1 shows an example SEMAN. The fundamental components of the SEMAN are shown in FIG. 1, and described by reference number as follows.

FIG. 1 also shows the externally coupled components of the energy gathering and food growing apparatus of the module. This apparatus is described by reference number as follows.

20—A wave and stream turbine to harvest energy from waves and module motion.

22—A wind turbine to harvest energy from the wind.

24—Wind deflectors or sails to deflect air into the wind turbine for increased efficiency and to provide forward motion of the module.

26—Solar concentrators/converters to gather sunlight and convert it into electricity and useable heat.

28—A land plant growing tank for containing plants, partially filled with soil.

Figure 2A:
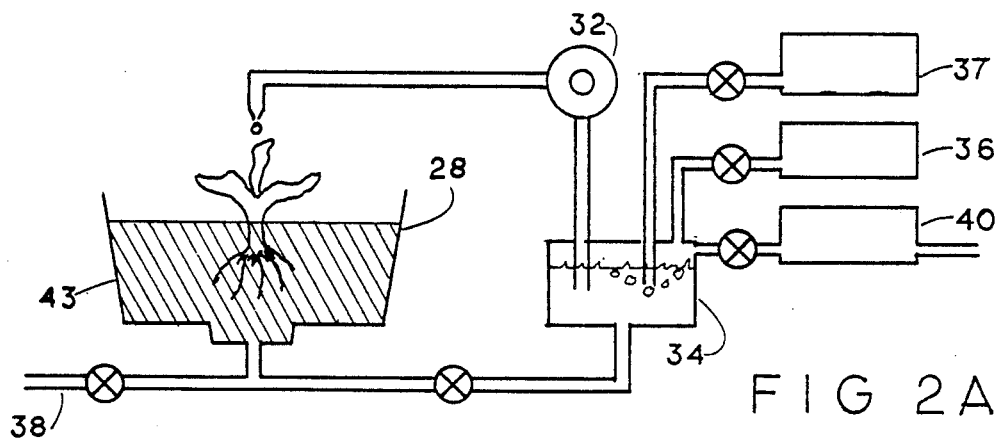
Figure 2B:
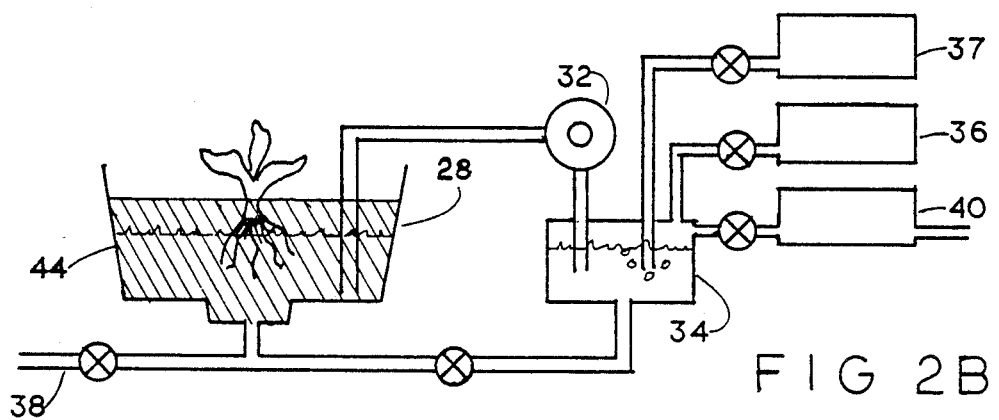
Figure 2C:
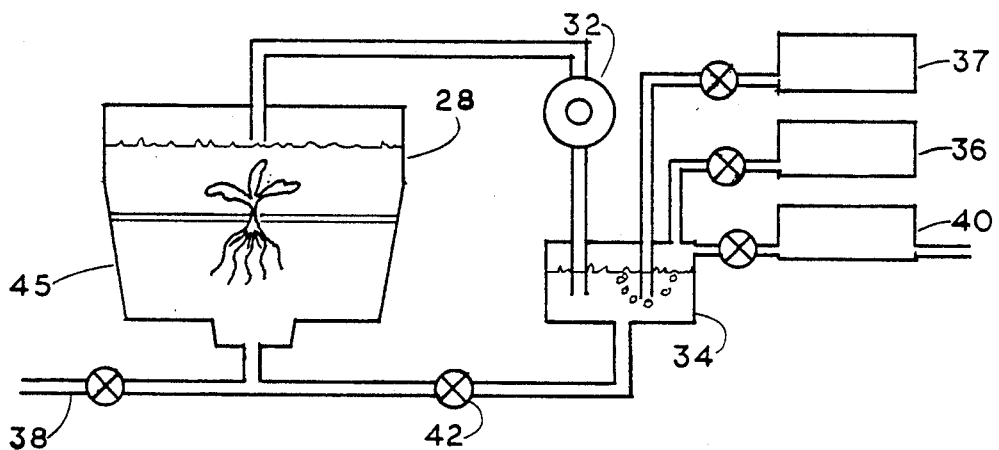

FIGS. 2A, 2B, and 2C show the land food crop growing apparatus. The basic components are described by reference numbers as follows.

32—A pump to provide fluid to the plant growing tank.
34—A storage container for the fluid which consists of water and fertilizer.
36—A storage container for fertilizer makeup, and a valve which meters fertilizer into the growth fluid.
37—A high pressure tank containing air to aerate hydroponic fluids.
38—A drain to remove a portion of the hydroponic fluid for the control of contaminents.
40—Desalinization apparatus and water storage.
42—Valve. (Typical)
43—A drip irrigation type tank.
44—A root immersion type tank.
45—A total immersion type tank.

Figure 3:
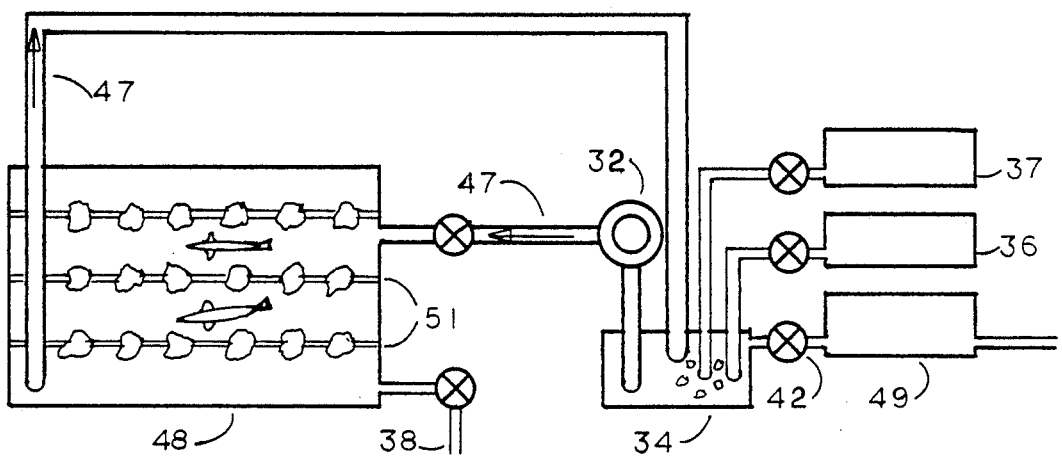

FIG. 3 shows the sea food crop growing apparatus. The basic components are described by reference number as follows.

47—Direction of flow of nutrient water.
48—Growth tank in the lower hulls of the SEMAN which carry racks of shellfish and/or swimming scalefish capable of feeding on the plankton grown in the floating bag.
49—Seawater intake and settling tank.
51—Racks for shellfish.

Figure 4:
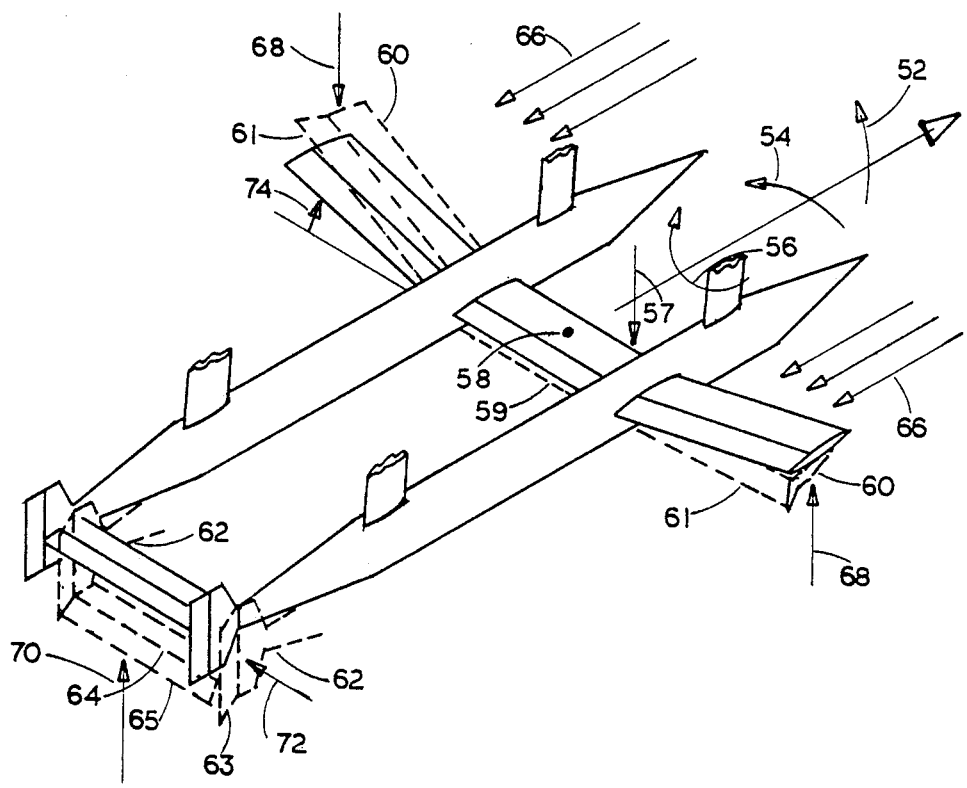

FIG. 4 shows the principle roll, pitch and yaw axes of the module, the stabilization moments connected with them, and the active wave oscillation control equipment used to reduce module oscillation. The basic components are described by reference number as follows.

52—An indication of the direction of pitch around the motion vector.
54—An indication of the direction of yaw around the motion vector.
56—An indication of the direction of roll around the motion vector.
57—An indication of the direction of sink from the motion vector.
58—The center of mass of the vehicle.
59—The position of the sea flap required to compensate for sink.
60—The position of the sea wing as a result of roll.
61—The position of the sea aileron required to compensate for roll.
62—The position of the sea fin as a result of yaw.
63—The position of the sea rudder required to compensate for yaw.
64—The position of the sea stabilizer as a result of pitch.
65—The position of the sea elevator required to compensate for pitch.
66—The direction of water flow.
68—The force on the sea wing due to position change in roll.
70—The force on the sea stabilizer due to position change in pitch.
72—The force on the sea fin due to position change in yaw.
74—The dihedral angle of the outer sea wing.

Figure 5A:
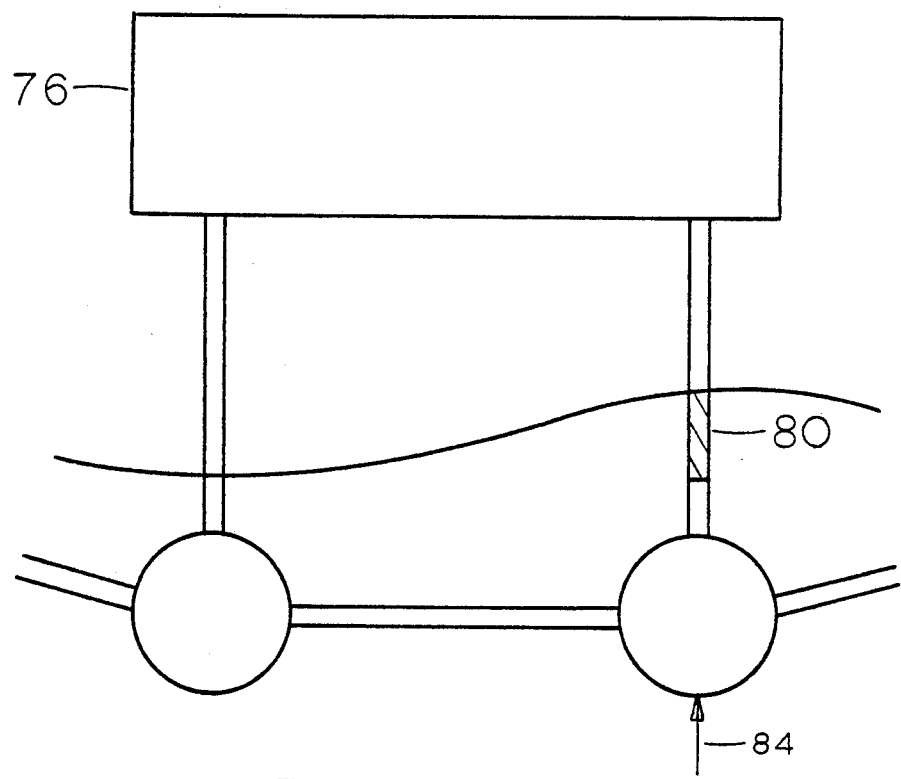
Figure 5B:
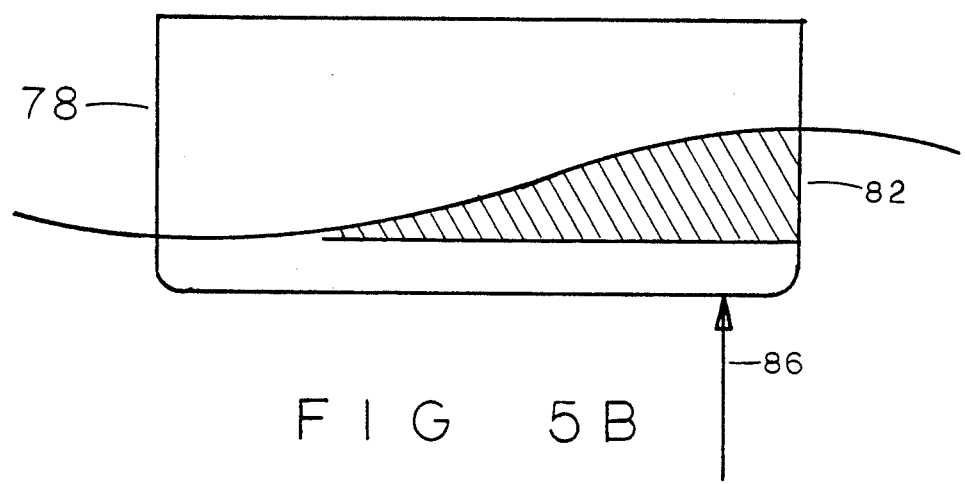

FIGS. 5A and 5B illustrate the passive wave oscillation control procedure used in the SEMAN, with components described as follows.

76—The SEMAN module.
78—Conventional ship.
80—Small unbalanced SEMAN displacement due to wave.
82—Large unbalanced conventional ship displacement due to wave.
84—Small force on SEMAN due to wave displacement.
86—Large force on conventional ship due to wave displacement.

Figure 6:
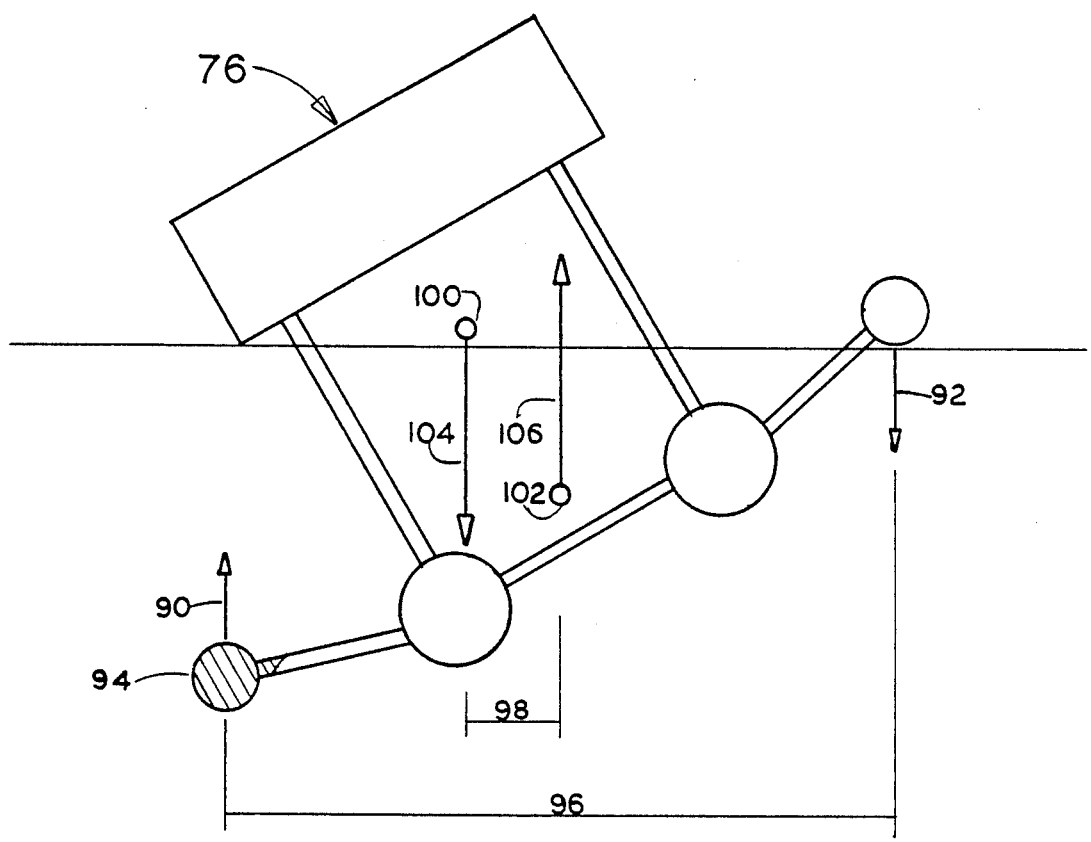

FIG. 6 shows the zero speed flotation procedure used to insure that the SEMAN remains upright, with components described as follows.

90—Force from unbalanced displacement due to submerged tip flotation tank.
92—Force from weight of unsubmerged tip flotation tank.
94—Unbalanced displacement due to one tip flotation tank being submerged and one not.
96—Moment arm on tip flotation tanks.
98—Moment arm on main flotation tanks.
100—SEMAN center of mass.
102—Center of flotation for main flotation tanks.

104—Gravitational force from SEMAN mass.
106—Force from buoyancy of main flotation tanks.

Figure 7A:
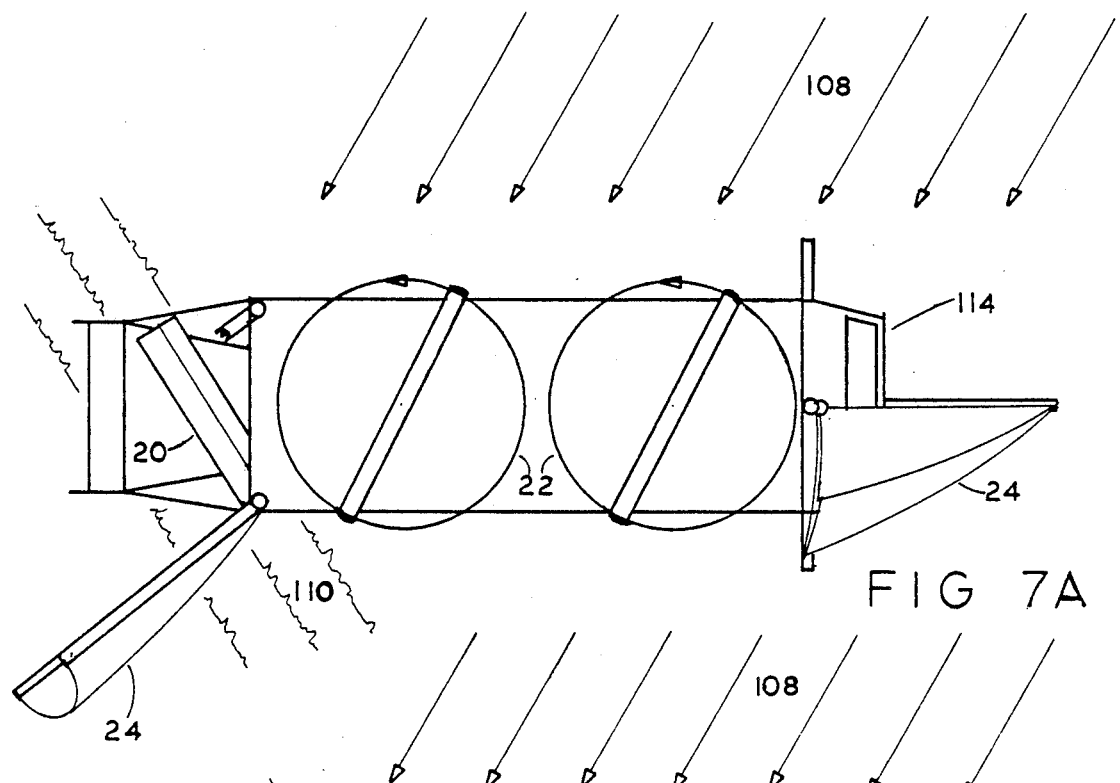
Figure 7B:
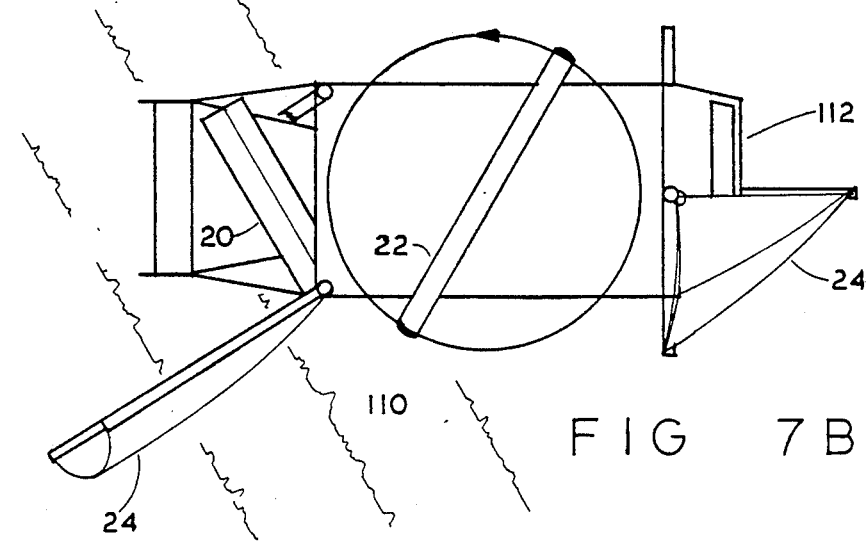

FIGS. 7A and 7B show the wind and wave generators and illustrates their operation with primary components described as follows.

108—Wind impinging on SEMAN.
110—Waves impinging on SEMAN.
112—Short form of SEMAN.
114—Long form of SEMAN.

Figure 8A:
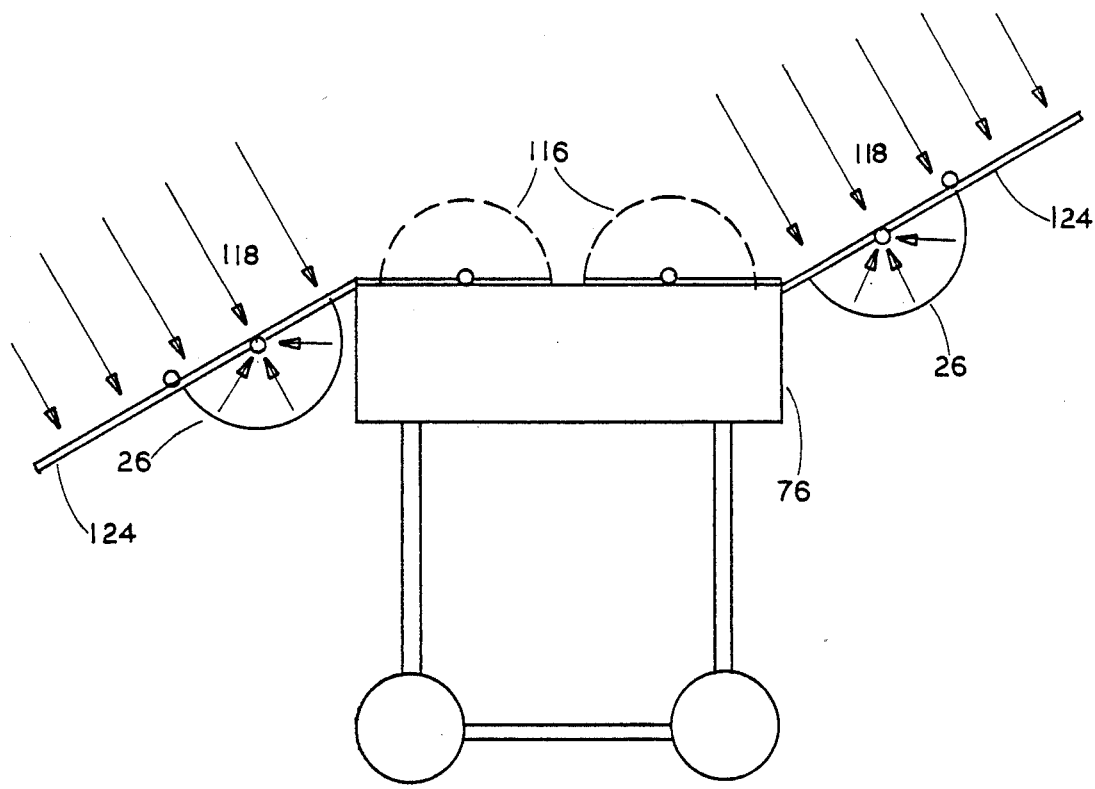
Figure 8B:
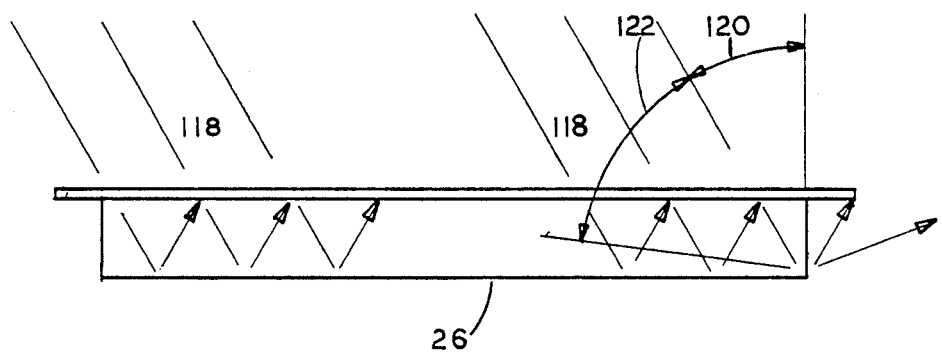

FIGS. 8A and 8B show the solar radiation collectors and illustrates their operation with primary components described as follows.

116—Solar concentrators/converters closed for storm.
118—Solar radiant energy.
120—Angular zone of acceptance of solar concentrator/converter.
122—Angular zone of loss of solar concentrator/converter.
124—Solar cell panel for cloudy weather.

DESCRIPTION AND OPERATION OF THE INVENTION

1. A Stabilized, Self-propelled Seagoing Module

The seagoing module of this invention operates by "flying" through the water rather than floating on it (FIG. 1.) The module can start at zero speed with the lower hulls (2) at the surface of the water but with the water line above the sea-wings and sea-elevator so that said sea-wings and sea-elevator (8), (10), (12) are beneath the water surface and the sea-fins (14) are partially covered as well. Note that said sea-wings and sea-elevator are coupled low on said lower hulls to ensure water coverage. A propulsive force is provided and the module moves forward allowing the water flow over the control surfaces to become effective in providing water lift. Water is taken in to the lower hulls and the buoyancy is brought down to near neutral. The trailing edge of the sea-elevator (8, FIG. 1) then is dropped and the bow of the module tilts down. The sea-wing (10, FIG. 1) goes to negative angle of attack of the sea-wing chord with respect to the water flow direction, and provides downward force and the module moves down into the water. When the water level reaches the half way mark on the struts which connect the top and bottom hulls, the sea-elevator trailing edge is lifted. The module levels out and the sea-wing goes to a small angle of attack and loses most of its downward force. It then flies through the water at constant depth in normal operating mode. In this mode, it operates like a lighter than air airship operates in air. The selection of near neutral buoyancy for the displacement of the lower hull allows the module to operate at low speed as opposed to a hydrofoil which must achieve high speed in order to have enough lift to "take off" and "fly" in the water. This low speed allows for the energy efficient low drag operation needed for energy gathering and moving from one high energy zone to another. Note that operation can also start at zero speed with the upper hulls at the surface of the water and the lower hull buoyancy negative. The trailing edge of the sea-elevator then lifts up and the sea wing lift becomes positive and the module lifts up to the operation level.

The small volume of the support struts gives a small oscillating moment to the module as a result of passing waves (FIG. 5A) and allows passage of a wave without much disturbance. The small volume of the support struts also allows for a reduction of gravity wave resistance to the motion of the module in the sea. Ordinary ships create gravity waves by displacement of water as the hull passes through the ocean surface. As speed increases, the energy dissipated in these waves increases. With this type of vessel, however, the small size of the struts reduces the surface displacement and the size of the resulting waves and therefore the energy dissipated. The shape of the trailing edge of the strut can also be used to reduce wave size. It should be noted, however, that total elimination of wave dissipated energy is not possible. At the very least, the energy in the bump wave formed by the passage of the submerged hulls through the water is lost. However, the dissipation due to the bump wave and the strut generated waves is much less than the dissipation due to ordinary hull generated waves.

Since the vessel of this invention does not have a appreciable stabilization force countering vessel motions in yaw, pitch and roll due to change of hull displacement distribution with pitch or roll, stabilization in yaw, pitch, and roll (FIG. 4) must be accomplished when the vessel is in motion by the stabilization surfaces—the sea-fin (14, FIG. 1), sea-wing (10, FIG. 1), and sea-stabilizer (8, FIG. 1) as with an aircraft, since displacement stabilization is impaired. The sea-fin stabilizes the module in yaw by providing a correcting yaw control moment if the module yaws (element 72, FIG. 4). This correcting yaw control moment is due to the fact that when a disturbance causes the module to yaw with respect to water motion, a force perpendicular to the side of the lower hulls and sea-fins occurs because the angle of attack of the surface is non-zero with respect to the water flow direction. If the area of the hulls and sea-fins behind the center of gravity is larger than the area of the hulls in front of the center of gravity, a net moment occurs around the center of gravity which tends to reduce the angle of attack of the hulls with respect to the water motion, i.e. reduce the change in yaw and stabilize the motion. The sea-stabilizer provides a correcting pitch control moment if the module pitches (component 70, FIG. 4). The correcting pitch control moment is due to the fact that when a disturbance causes the module to pitch with respect to water motion, a force perpendicular to the top or bottom of the lower hulls and sea-elevator occurs. If the area of the hulls and sea-elevator behind the center of gravity is larger than the area in front of the center of gravity, a net moment occurs around the center of gravity which tends to reduce the angle of attack of the hulls, i.e. reduce the change in pitch and stabilize the motion. Roll stability is obtained by dihedral angle in the outer sea-wing (component 74, FIG. 4). Lift is lost on the high sea-wing and gained on the low sea-wing as the module rolls in the following way. Consider the case where the buoyancy force from the lower hull is less than the gravity force of the vessel and the wing lift force is positive. When a disturbance causes the module to roll (60), the vertical velocity of the sea-wing in the water changes its effective angle-of-attack and causes an opposite force on each wing which stops the rotation, but at an angle which leaves the lift and gravity forces out of balance. The downgoing sea-wing also experiences an increase in drag, and the upgoing sea-wing a decrease in drag. The righting force due to roll then goes to zero. The resultant forces cause a sideslip and yaw in the direction of the roll. The low sea-wing experiences an increase in lift because the side-slip acts on the upward tilted (positive dihedral (74)) wing to give an apparent increase in angle of attack. The high sea-wing experiences an opposite decrease in lift. Thus the low sea-wing is brought up level where the restoring force dies away. At the same time, the fin provides a restoring force to straighten out the above-mentioned yaw. Note that for the case where the buoyancy force from the lower hulls is greater than the gravity force on the vessel, the discription of the stabilizing forces on the lift and control surfaces given above is still valid, except that the sea-wing lift force is negative, the direction of the stabilizing forces are reversed, and the correct dihedral angle for stabilization is negative. More complex instabilities such as combinations of yaw, pitch, and roll are controlled by adjusting sea-wing, sea-stabilizer and sea-fin dihedral angles. These complex instabilities are due primarily to overshoot in the roll stabilization process due to inertia. When a roll cycle is completed and the module sea-wings are level, the forces on the module die out, but inertia may carry the module through the equilibrium position to produce an opposite roll and thus repeat the roll stabilization cycle. This oscillation can be damped when necessary by giving the stabilizer a dihedral with an angle opposite in sign to the wing dihedral and with a value sized to partially counter the roll stabilization force of the sea-wing late in the stabilization cycle when the sideslip and yaw are underway. A similar damping can be achieved by angling the fin. It is important to note that the displacement righting moments (FIG. 5A) of the module are deliberately kept low to reduce wave generated oscillations of the module. Such displacement righting moments are generated by strut displacement. Large volume struts give large displacement righting moments and also cause a large disturbance of the wave field on the surface of the sea. Small volume struts (with resulting small water line circumfrance) are thus chosen to ensure resistance to wave oscillations. This choice demands that other ship stabilization techniques, i.e. the use of the stabilization surfaces described above and in FIG. 4, be used. Note, however, that the surfaces stabilize only while the module is moving.

Even though the module architecture reduces wave displacement oscillations, there is still a residule oscillation due to cycloidal motion of the water under a wave as mentioned above. This motion will press against the submerged components of the module and cause an oscillating displacement and moment. This moment can be countered by the control surfaces, i.e. the sea-rudder (14), sea-elevator (8), sea-aileron (12), and sea-flap (10), as shown in FIG. 4. The operator counters unwanted yaw motion by actively moving the sea-rudder trailing edge in the same direction as the motion. Similarly, the sea-elevator (8) and sea-aileron (12) counter unwanted pitch and roll motions by moving the trailing edges of the sea-elevator and sea-aileron respectively in the same direction as the motion. The sea-flap counters unwanted vertical motion by moving the trailing edge of the sea-flap in the same direction as the motion. Motion with four degrees of freedom (roll, pitch, yaw, and vertical displacement) is possible using these control surfaces, and the basis for the motion is as follows. Angling of the sea-rudder causes a change of lift on one side of the sea-rudder due to the change of the angle of attack of the sea-rudder surface with respect to the moving water. The change in lift pushes the sea-rudder to the side at a distance from the center of mass of the module and thus causes a yaw angle change of the module. Angling of the sea-elevator causes a similar change in lift on one side of the surface and pushes the sea-elevator up or down at a distance from the center of mass of the module and thus causes a pitch angle change of the module. However, changing the pitch angle changes the angle of attack and thus the lift of the wing at the center of mass and causes the module to rise or fall as a unit in the water as well as change pitch angle. To counter this effect, a compensating change in the flap angle of the sea-wing at the center-of-mass can nullify the sea-wing lift and cause an independent change of vertical force. Angling the sea-ailerons in opposite directions pushes the sea-wing tips up or down at a distance from the center of mass and thus causes a roll angle change. Only relatively small corrective forces are required to smooth out wave-caused motions because of the inherent wave oscillation resistance of the module architecture as mentioned above. The drivers of the control surfaces could be controlled by a computer fed with roll and pitch outputs from a stable platform on the module maintained by a pendulum or gyro stabilized platform. To obtain smooth operation in heavy seas, it may be necessary to use an anticipating sensor which measures the height and impact time of a wave before it has effected the module, and use the sensor data to control the drivers of the control surfaces. Wave imaging and ranging sensors based on reflection of visible or sound waves can accomplish this sensing task. With the addition of automatic course setting equipment which controls the sea-rudder and sea-ailerons, complete automatic control of the roll, pitch, yaw, depth of operation, and course of the module can be achieved. This capability is referred to as Automatic Navigation-stabilization in this disclosure. The apparatus used to automatically counter the wave generated motion of the module comprises the following control surface drivers.

(1). Sea-elevator Drivers

The first driver has a response time which is long compared to the natural vessel oscillation time and which controls the angle of the sea-elevator and responds to the long time average of the pitch sensor with a trailing edge down control (65) if the average pitch error is nose up (64), and up control if the average pitch error is nose down.

The second driver has a response time which is short compared to the natural vessel oscillation time and which controls the angle of the sea elevator and responds to the pitch angle and wave height and impact time sensors with a trailing edge down control (65) in advance of the wave impact, the lead time determined empirically for vessel inertia, when the anticipated pitch error of the vessel is nose up (64) and up control when the anticipated pitch error is negative, the control magnitude average being limited over long times by the long response time control.

(2). Sea-aileron Drivers

The third driver has a response time which is long with respect to the natural vessel oscillation time and which controls the angle of the sea ailerons and responds to the long time average of the roll angle sensor reading with a right trailing edge down control (61) when the average roll angle reading shows a clockwise roll error (60) from the local level, and right up control when the reading shows a counterclockwise roll error.

The fourth driver has a response time which is short with respect to the natural vessel oscillation time and which controls the angle of the sea-ailerons and responds to the roll angle and wave height and impact time sensors with a right sea-aileron trailing edge down control (61) in advance of wave impact, the lead time being determined empirically for vessel inertia, when the anticipated roll error is clockwise from local level (60), and right up when the anticipated roll error is counterclockwise, the control magnitude average being limited over long times by the long response time roll control.

(3). Sea-rudder Drivers

The fifth driver has a response time which is long with respect to the natural vessel oscillation time, and which controls the angle of the sea-rudder and responds to the time average course sensor with a trailing edge right control (63) if the average course reading shows a left turn error (62), and left if the reading shows a right turn error.

The sixth driver has a response time which is short with respect to the natural vessel oscillation time and which controls the angle of the sea-rudder and responds to the yaw angle and wave height and impact time sensors with a trailing edge right control (63) in advance of wave impact, the lead time being determined empirically for vessel inertia, if the anticipated yaw angle error is a left turn (62), and trailing edge left if the anticipated error is a right turn, the control magnitude average being limited over long times by the long response time control.

(4). Sea-flap Driver

The seventh driver has a response time which is long with respect to the natural vessel oscillation time and which controls the angle of the sea-flap and responds to the long time average of the depth sensor with a trailing edge down control (59) if the average sea level is above half way between the upper and lower hulls, and up control if the average sea level is below half way.

The eighth driver has a response time which is short with respect to the natural vessel response time and which controls the angle of the sea-flap and responds to the vertical acceleration and wave height and impact time time sensors with a trailing edge down control (59) in advance of wave impact, the lead time being determined empirically for vessel inertia, if the vertical acceleration estimate shows an anticipated down acceleration error (57), and a trailing edge up if the anticipated acceleration error is up, the control magnitude average being limited over long times by the long response time control.

Note that computer driven power controls can be replaced with human operated controls for simplicity and cost reduction. The Automatic Navigation-stabilization system considerably exceeds the stabilization possible with methods patented by others (Reference U.S. Pat. Nos. 3,797,433 and 3,738,304) since prior patents deal only with roll oscillations on conventional ships. Also, the operation of this invention differs markedly from previously patented wave stabilization methods (Reference U.S. Pat. Nos. 3,986,471, 3,797,433, and 3,738,304) in that combinations of both passive and active wave motion damping are used.

Since the primary stabilization procedure requires forward module motion, it is necessary to use separate, zero-speed stabilization apparatus to ensure stability when the module starts up or loses power. The wing-tip flotation tanks accomplish this purpose (FIG. 6). if propulsion power is lost, and the submerged lower hulls move unevenly toward the surface, one limit tank breaks the surface first and with its submerged opposite, it provides a correcting moment which will not allow the module to continue to roll as long as the tanks are large enough to insure that the correcting moment (forces 90 and 92 times moment arm 96) is larger than the moment due to the gravity force (104) and the center of flotation (106) times the moment arm (98). Tank displacement and weight are designed to insure that this stability criterion is maintained. Note that stabilization tanks (16) can be functionally replaced by the main lower hulls (2) if the main lower hulls are spaced far enough apart. Also the lower hulls can be replaced by a single hull if it is always submerged, or if it has a broad and flat shape for displacement stability when the lower hull is on the surface.

2. Energy Gathering, Generation, and Storage Apparatus

The primary product of the Seagoing Energy Module is energy. It is used to operate domestic household equipment, control suface sensors and drives and the propellor drive. Most important, it is converted to some storable form and then sold to land-based nations for reconversion to electrical and other types of energy. The module is designed to be large enough to generate the income necessary to pay for the loan required to construct it and provide the repair parts, lubricants, fertilizer, and other materials required to operate it. There is a size limit, however. If large enough, self-interference occurs in the wind and wave energy harvesting equipment with a resulting loss of efficiency.

A. Energy Gathering Equipment

Different kinds of energy converters (FIG. 1) are required to ensure efficient energy collection under all important conditions of weather and during both day and night. Efficient energy collection during storm conditions requires wind and wave turbines. Solar radiant energy collectors have poor efficiency on cloudy, stormy days. Efficient energy collection on windy, clear days requires wind and wave turbines and solar radiant energy collectors. On windy, clear nights, wind and wave turbines are sufficient. On windless, clear days, solar radiant energy collectors and wave turbines are required. On windless nights, wave turbines are sufficient. Lack of wind does not necessarily imply no waves. Only windless, waveless nights provide no energy to the module for harvest. Energy harvesting routes have been established which follow high wind and wave zones on the earth (see related patent application "Methods for Harvesting Energy and Other Necessities of Life at Sea"). These routes will be chosen which avoid areas of the sea such as the Sargasso Sea that have neither wind nor waves for long periods of time. Wind and waves are a much more concentrated form of energy, and therefore more efficient for harvest than solar. Each of these energy collection devices will be described below in sufficient detail to indicate how the module and its energy collection devices are sized.

(1). Wind Turbines

The power which can be gathered from wind is proportional to the area intercepted and the third power of the wind speed. Ship length determines wind turbine size, since the turbine can't be much larger in diameter than module length and remain stable in high winds (FIG. 7B). The height of the turbine is also limited by module stability considerations to roughly ship length. Thus wind energy harVesting capability increases roughly as the square of module length since turbine diameter and height can both be increased if module length is increased. If module length is great enough, it may be necessary to use a two or more turbine configuration (FIG. 7A), but the proportion still holds. Now it has been found that module cost increases roughly as ship length to the 1 to 1.5 power. So there will be a length at which the energy harvesting capability of the ship—and thus its earning power—will exceed the cost of the ship—s expenses—mortgage, parts, fertilizer, and miscellanious materials costs. This is the break-even design length. Note, however, that if the number of closely spaced turbines of configuration 114 is large enough, interference can lower efficiency, and so there is a maximum economic size.

The vertical axis wind turbine (Reference U.S. Pat. Nos. 1,835,018 and 1,820,529) appears best suited for the module as shown in FIG. 1 and FIGS. 7A and 7B, although other designs will work. The sails (components 24, FIGS. 7A and 7B) are designed to deflect wind into the rotors, and shape its passage from the rotors to minimize the size of the stall zone of the vertical axis rotor in order to maximize efficiency. The sail also provides a forward component of module velocity which can be used for passage to a new energy zone and to provide an energetic stream flow which can be harvested with wave/stream turbines. (see below). The front main sail or sails (24) is placed in front of and close to the foremost wind turbine and coupled to the main mast and bowsprit. The front sail is approximately the same height and width as the formost turbine, and is held by lines at an angle to the incoming wind (108) which insures that the wind will be deflected toward the turbine (22). The deflected wind presses against the sail and thus gives the forward propulsive thrust to the vessel mentioned above. The sail also gives an increased capture area for wind into the turbine, and so increases turbine efficiency for side and rear winds. The rear sail is of a similar size to the front sail and is attached to a rear mast placed close to the rearmost turbine. The rear sail also shapes wind flow exiting the turbine for improved efficiency, and deflects the wind to the rear, giving a forward propulsive thrust to the vessel.

Initial estimates of optimum design length fall in the range of 50 to 150 feet, and so are reasonable.

(2). Wave/Stream Turbine

The power which can be gathered from wave and stream action due to natural sea waves and the forward motion of the module caused by sails (FIGS. 7A and 7B), is proportional to the square of wave height, the third power of stream velocity, and the first power of turbine width. Turbine height is determined by wave height. The width of the turbine is limited roughly by the distance between the two lower hulls of the module due to stowage and structural support requirements (component 20, FIGS. 7A and 7B). The distance between lower hulls is limited roughly to one fourth to one sixth of module length due to stability, propulsion, and docking requirements. Thus the wave and stream energy harvesting power varies roughly as the first power of ship length, and ship cost increases roughly as ship length to the 1 to 1.5 power. However, the sails provide forward motion which generates stream flow energy and so the energy revenue gathered again increases faster than module cost as length increases. So again there exists a module of sufficient length to be profitable. Note, however, that if the water turbine is long enough, it will lose efficiency due to wave front curvature and incoherence.

Water turbines capable of harvesting both stream and wave energy must be used here to get maximum energy output. Reference U.S. Pat. Nos. 1,697,574, 4,359,868, and 4,279,124 show three example means of extracting energy from waves and streams. Various configurations of the turbine described in Reference U.S. Pat. No. 1,697,574 seem most conveneient for a SEMAN. Note that the module configuration given in this patent minimizes wave disturbance as opposed to ordinary ships and thus maximizes wave energy extraction efficiency. The waves pass through the module struts rather than being stopped by a ship hull. Placement of the wave and stream turbine (20) to get maximum energy from the wave is dependent on wave height. For a Savonius turbine, the cup-shaped turbine blade should operate just below the wave top (20, FIG. 1) to catch the rotating, cycloidal motion of the water in the wave. The turbine should be somewhat larger in diameter than the wave height to make best use of wave motion. The turbine is normally sized for waves in the 4 to 10 foot range. Larger waves are damaging and smaller have too little energy. The operating principle is as follows. The rotating motion of the water due to the wave is caught by the turbine cups to give rotation as shown. Forward (stream) motion also provides rotational energy to the turbine by using the different resistances of the turbine cups to the motion of the turbine in the water to cause a torque on the turbine.

Initial estimates of optimum design length are again in the 50 to 150 foot region.

(3). Solar Radiation Collectors

The power that can be gathered from solar radiation collectors (FIGS. 8A and 8B) is proportional to ship length and width. More precisely, the solar collector length is normally equal to module length and its width is equal to the module width. Two types of energy can be obtained from the solar collector—electrical and heat energy. Design criteria for the collectors are not energy profit as for wind and wave harvesting apparatus. Insted they have been chosen as:

(1). Electrical energy generated by the solar collector must cover domestic needs and propulsion if the need arises—i.e. module is becalmed and only solar radiation energy is available.

(2). Heat energy left by the electrical energy conversion process should cover heating and air conditioning loads with an absorption cooler/heater.

Again the gathering power of the solar collectors grows roughly as the square of module ship length (since ship width increases with length). Since ship cost increases roughly at the 1 to 1.5 power of length, there is a length which meets the criterion.

Solar collectors of several types are possible. The most trouble-free and inexpensive is a cylindrical collector (26) with a pipe at the focus filled with coolent and covered with solar cells. The collection mirror is pointed roughly toward the sun around the axis, and it collects the radiation onto the solar cells and coolant of the center pipe. Losses due to sun position angle along the length of the axis are small due to the length of the mirror (122, FIG. 8B). Coolant carries off the excess heat and deposits it into the heat exchanger for domestic heat or absorption cooling. For cloudy days, a flat panel collector covered with solar cells (124, FIg. 8A) is best because the sun's light comes from a complete hemisphere on cloudy days rather than a local source as on sunny days. A flat panel gathers light from a hemisphere, but a cylindrically focussed collector gathers light from only a local zone. The focussing cylindrical collector cannot focus diffuse light. The flat panel collector requires a different type of electrical energy generator, however, which will be described below. Use of both types of solar collectors is best, one for sunny and one for cloudy days. The flat collector ca be folded out of the way when not in use. When in use, it blocks the cylindrical collector.

Initial estimates of the optimum design length are again in the 50 to 150 foot range.

B. Energy Generation Equipment

The output of both the Wind and Wave Turbines is in the form of mechanical energy (a rotating shaft). Connection of this shaft through gears and belts to a generator gives the electrical energy needed for conversion to a storable form.

The output of the solar radiation collector is in the form of heat (cylindrical collector), or visible radiation (flat panel collector). With the cylindrical collector, the solar cells generate electricity and then the heat is converted to electrical energy and waste heat by use of a turbine or some other heat engine coupled to a generator. With the flat panel collector, solar cells are used as the most efficient method of converting the visible radiation into electricity and waste heat. In all cases, waste heat is used in evaporators to generate fresh water.

C. Energy Storage Equipment

A simple means of storing energy in a compact form is by breaking down water with electricity to form hydrogen and oxygen in a water electrolysis unit. Such water electrolysis units are merely charged electrodes placed in a slightly conductive water solution. They are commercially available because they are commonly used by electric power utilities to generate hydrogen for cooling the turbines as well as for other applications and so will not be described in detail here. It can be stored in high pressure steel bottles or in metal hydrodes. The latter is safer, since the hydrogen escapes only when heated and then only at a moderate rate, so an explosive mixture cannot build up. When delivered to the land, the hydrogen and oxygen can be reconverted into electricity with high efficiency by use of hydrogen-oxygen fuel cells.

Another method of storage is to convert the electrical energy to hydrogen and oxygen and use a high temperature catylic converter to convert the hydrogen and celulose generated in the hydroponic garden (see 3 below) into crude oil stock.

3. Land Crop Growing Equipment

A secondary product of the SEMAN is food crops normally grown on land such as food grains, vegetables, and fruits. These crops can also be converted to poultry, but conversion to meat appears inefficient considering space limitations on a SEMAN. The food is used primarily for the SEMAN operators, but some specialty foods (mushrooms and poultry, for example) can be grown and sold for profit.

The land crop growing equipment (FIGS. 2A, 2B and 2C) is of three types, drip irrigation, root immersion, and total immersion. Each equipment type will be described below. The auxiliary equipment, i.e. water storage (40), high pressure tank for gas infusion (37), fertilizer make-up tank (36), fluid storage container (34), plant growth tank (28), pump (32), valves (42), and drain (38), is common to all.

A. Drip Irrigation System

Drip irrigation (configuration 43) is designed to grow land food plants with a concentrated root system such as tomatoes, squashes, fruit trees, berry bushes, etc. The operation of the drip irrigation system is as follows. During the plant growth period, nutrient fluid from the storage tank (34) is pumped with pump (32) onto the food plant in a tank (28) partially filled with soil in a steady, drop-by-drop flow adjusted for maximum product yield. When the food plant reaches maturity, it is harvested and new seedlings planted. Excess fluid drains down into the bottom of the tank and then out the drain (38). The bottom valve for the storage tank (34) is regularly opened and fluid is allowed to rise in the tank (28) to disolve nutrients left by evaporating fluid and thus control contamination. Air (37) is bubbled, Fertilizer (36) dripped, and makeup water (40) added into the storage tank (34) to maintain its level and nutrient value. The composition of the fluid additives and the details of the valves and pumps are not described here because they are well known and in common use for drip irrigation applications and are commercially available.

B. Root Immersion System

Root immersion (configuration 44) uses the same components as the drip irrigation system except the tank uses a valve which closes periodically to build up a pool of hydroponic fluid in the bottom of the tank for root immersion. Root immersion is designed to grow land food plants with distrubuted stems and/or roots such as grains and row crops. The operation of the root immersion system is as follows. One to several times a day during the plant growth period, nutrient fluid from the storage tank (34) is pumped by pump (32) into the tank (28) partially filled with soil until the plant's roots are covered with water. The water is allowed to stand for a short time, and then it is pumped back into the tank (28). residual fluid is drained (38) to control contaminents. The timing of the cycle is adjusted for optimum product yield. When the food plant is mature, it is harvested and new seedlings planted. Air (37) is bubbled, fertilizer (36) dripped, and makeup water added into the storage tank (34) to maintain its level and nutrient value. The composition of the fluid additives, and the details of the valves and pumps are not described here because they are well known and in common use for hydroponic applications and are commercially available.

C. Total Immersion System

This system (configuration 45) again uses the same components as the drip irrigation system except the growth tank is totally filled with water, and the food plant is suspended in fluid. The Total Immersion system is designed to grow several water food plants suited for suspension. The operation of the total immersion system is as follows. During the food plant growth period, nutrient fluid from the storage tank (34) is pumped steadily through the growing tank (28) and back into the storage tank by the pump (32). The flow rate is adjusted for maximum crop yield. A portion of the fluid is drained to control contaminants. When the plant is mature, it is harvested and new seedlings planted. Air (37) is bubbled, fertilizer (36) dripped, and makeup water (40) added into the storage tank (34) to maintain its level and nutrient value. Fluid composition and the details of valves and pumps are not described here because they are well known and in common use for hydroponic farming and commercially available.

The land crop growing equipment is distributed on the top deck and both natural and artificial light can be used. That light source is chosen which maximizes yield. Artifical lights are also used for the long cloudy periods when the SEMAN is gathering energy near storms.

D. Desalination Equipment

The seawater desalinization machines (40, FIGS. 2A, 2B and 2C) are tailored to purity requirements in order to minimize energy use. Reverse osmosis machines are normally used for general reduction of the salt in seawater. Electricity harvested from wind and waves provides the needed energy. Evaporation or freezing is used when higher purity water is required. The energy for this process comes from the solar radiant energy collectors (heat). Concentrated tailings from these desalination processes can be processed further to obtain the basic ocean salts when economically profitable. The desalination equipment operates as follows. In reverse osmosis, saline water is pumped at high pressure through a membrane. Salt is preferentially left behind on the high pressure side of the membrane. Energy needed for desalination is supplied to the pump. In evaporative desalination, water is evaporated from saline water and then condensed in a separate container. Salt is preferentially left behind in the saline solution. Energy needed for desalination is supplied in the heat needed for evaporation. In freezing desalination, ice is frozen out of saline water, skimmed off and melted in a separate separate container. Energy needed for desalination is supplied in the energy needed for freezing. The equipment needed for each of these processes is commercially available and therefore is not described in detail here.

Initial estimates indicate that a 50 to 150 foot SEMAN can yield enough food and fresh water for 4 adults, or 2 adults and 4 children.

4. Sea Crop Growing Equipment

All of the basic requirements of a group of 4 to 6 people are supplied by the apparatus described in subsections 1, 2, and 3 above. The shellfish and scalefish harvested from the sea crop growing equipment (FIG. 3) can be sold to increase profit margin of the SEMAN and to supplement the food from the hydroponic growth tanks. The nutrient fluid is used to feed shellfish and scalefish in a tank. Fluid fertilizer (44, 46), storage (34), and pump (32) equipment is used as with the land crop growing equipment. The operation of the sea crop growing equipment (FIG. 3) is as follows. Nutrient laden fluid is pumped steadily as shown by the flow arrows (47) from the storage tank (34). The fluid then passes through the fish tank (48) where the shell and scale fish feed on the nutrients in the fluid and then back into the storage tank. A portion of the fluid is drained (38) to control contaminents. Air (37) is bubbled, nutrients dripped, and makeup seawater (49) added into the storage tank (34) to maintain its level and nutrient value. The pump (32) is of special importance here, because it must not damage the nutrients significantly and the nutrients often contain multi celled animals and plants (plankton). A simple helix rotating at low speed has acceptable characteristics in avoiding surface contact between the impeller and the pump housing, or rapid change of direction in fluid motion. It has been proposed for use in pumping blood because it does not damage blood cells and is sometimes referred to as a "gentle pump".

Shellfish and scalefish types are chosen which provide a compatible and efficient eco-system. Thus each component can support the other with enough feed to maximize shellfish and scalefish growth. The fertilizer injectors and drains are set to ensure optimum nutrient concentration for growth and an acceptable level of waste products.

CONCLUSION AND SCOPE OF THE INVENTION

This invention comprises all of the apparatus necessary to exploit the energy and space of the sea. In addition, one of the components, the Seagoing Module, along with the wind turbine as a drive, can be used as a stable ship for recreation and transportation purposes.

Not all of the equipment described above is required to achieve an economically viable SEMAN. Some components are added to provide extra products which ensure a good profit for SEMAN dwellers. The minimum requirements are:

(a). A stable seagoing vessel which gives minimal disturbance of waves.
(b). An energy gathering device, either a wind or a wave turbine along with an energy conversion and an energy storage device.

I claim:

1. A vessel adapted for operating at the surface of the ocean, said vessel comprising: a first hull and a second hull, said first hull being vertically aligned with said second hull, said first hull to be fully submerged and said second hull to be fully unsubmerged; streamlined struts coupling said first hull and said second hull together; fixed and moveable lift and stabilization means coupled to said first hull for operating said vessel at near neutral buoyancy; and lift means adjusted to operate said vessel at a depth so that the average waterline is approximately halfway between said first hull and said second hull, thus providing a small vessel area at the waterline even when the overall vessel displacement is large; said stabilization means comprising a combination of fixed passive lift and stabilization surfaces which automatically stabilize said vessel without requiring control movements for use when the vessel is in motion, said combination comprising:

first, substantially horizontal appendages (sea-stabilizers) of such an area as to provide stabilizing moments around the center of gravity for stabilizing said vessel in pitch and fixedly coupled to the first hull to the rear of the center-of-gravity of the vessel and having an angular tilt with respect to the horizontal plane fixed to provide stabilizing moments to suppress combination roll, pitch, and yaw instabilities;

second, substantially vertical appendages (sea-fins) of such an area as to provide stabilizing moments around the center of gravity for stabilizing said vessel in yaw and fixedly coupled to the first hull to the rear of the center-of-gravity of said vessel and having a tilt with respect to the vertical plane fixed to provide stabilizing moments to suppress combination roll, pitch, and yaw instabilities;

third, substantially horizontal appendages (sea-wings) of such an area as to provide lift and stabilizing moments around the center of gravity for supporting and stabilizing said vessel in roll and fixedly coupled to the first submerged hull near the center-of gravity, having a tilt or dihedral with respect to the horizontal plane fixed to provide stabilizing moments to ensure roll stability;

fourth, fixed stabilization reservoir means for providing stability automatically when the vessel is not moving, said stabilization reservoir means comprising at least two tanks coupled to the tips of the sea-wings, each said tank capable of containing the amount of air and water needed for zero-velocity stability, said tanks and wings being capable of being pivoted into vertical position when said vessel is docked.

2. The vessel of claim 1, wherein the stabilization reservoir means are fixed and submerged while the vessel is operating and sized to provide stability limits in roll when the vessel is not moving and the stabilization surfaces are ineffective, the size being such that the product of the lateral displacement from the vessel center-of-gravity with the submerged reservoir displacement when the opposite reservoir is above the water surface gives a moment greater than the destabilization moment caused by the upper hull being clear of the water.

3. The vessel of claim 1 wherein the sea-stabilizing are sized for pitch stability while the vessel is in motion such that the product of the horizontal area of the sea-stabilizer and the area of the lower hull behind the center of gravity of the vessel and the distance of the centroid of said horizontal areas to said center-of-gravity is significantly greater than the product of the horizontal area of the hull in front of the center-of-gravity of the vessel with the distance of the centroid of the horizontal area of said hull to said center-of-gravity; the sea-rudders are sized for yaw stability while vessel is in motion such that the product of the vertical area of the sea-rudder and vertical area of the lower hull behind the center of gravity of the vessel and the distance of the centroid of said vertical areas to said center-of-gravity is significantly greater than the product of the vertical area of the hull in front of the center-of-gravity of the vessel with the distance of the centroid of the vertical area of said hull to said center-of-gravity; the sea-wings are sized and angled for roll stability while the vessel is in motion such that the sea-wing area and dihedral angles are large enough to provide a righting moment after a roll displacement which is greater than the destabilization moment caused by the upper hull being clear of the water; said sea-elevators and rudders being angled with respect to the horizontal and vertical planes, respectively, at angles fixed to damp combined roll, yaw and pitch motions.

4. The vessel according to claim 1, further including a combination of actively controllable moveable surfaces capable of causing vessel motion with four degrees of freedom for use when the vessel is in motion, said movable surfaces comprising:

first, substantially horizontal moveable vanes (sea-elevators) coupled to the first hull to the rear of the center-of-gravity of the vessel;

second, substantially vertical moveable vanes (sea-rudders) coupled to the submerged hull to the rear of the center-of-gravity of the vessel;

third, substantially horizontal moveable vanes (sea-ailerons) coupled to the first hull near the center-of-gravity of the vessel along the roll axis but placed to the right and left of the center of gravity along the pitch axis;

fourth, substantially horizontal moveable vanes (sea-flaps) coupled to the first hull near the center-of-gravity of the vessel along both the roll and pitch axes of the vessel.

5. The vessel according to claim 4, further including, in combination, means of converting natural energy into propulsive energy comprising: a sail, a wind turbine, a wave and stream turbine, a solar radiation collector, and a means of converting hydrogen and oxygen into mechanical energy.

6. The vessel according to claim 4, further including, in combination, vertical axis wind turbines mounted on the second hull for harvesting wind energy.

7. The vessel according to claim 4, further including, in combination, solar radiation collectors mounted on the second hull comprising for use on sunny days, a multiplicity of half cylinder radiation concentrators and a tube at the solar radiation focus containing a fluid for coolant, the tube being covered with solar cells for collecting solar energy and converting it directly to electrical energy, as well as flat solar radiation collectors covered with solar cells for use on cloudy days, the unused collector being folded out of the way.

8. The vessel according to claim 4, further including, in combination, horizontal axis water turbines coupled to the vessel and disposed to operate near the water surface with depth of submergence set to wet the lowest of the turbine cups at wave minimum in order to maximize energy harvested from wave and water current flow.

9. The vessel according to claim 4, further including, in combination, means for converting mechanical energy to electrical energy and for storing said electrical energy in a storable and transportable form, such means comprising an electrical generator and a water electrolysis unit to convert water into hydrogen and oxygen and accompanying hydrogen and oxygen storage tanks.

10. The vessel according to claim 4, further including, in combination, a shelter for carrying on all daily living activities necessary to live on the sea and not come to land for at least one person said shelter including, bed, eating table and utinsils, food storage and refrigeration equipment and cooking stove, work shop and tools and recreation space and recreation equipment.

11. The vessel according to claim 4, further including, in combination, sea crop growing apparatus for shellfish and scale fish growth, comprising: closed tanks filled with seawater, as well as the tubes, valves, pumps, and timers required to provide water circulation, nutrient addition, and waste water and solid waste elimination.

12. The vessel according to claim 11, further including, in combination, apparatus for growing land crops in the submerged hull open to the sunlight, comprising:

first, seawater desalination apparatus comprising one or more of the following: a high pressure pump and a permeable membrane for reverse osmosis desalination, or a heat exchanger and a condenser for evaporation desalination, or a freezer and melter for freezing desalination;

second, an open top tank filled with loose material for plant support, artificial grow lights for use when the light level is low, a tube positioned above the open top tank with small holes drilled in it for use as a drip irrigation source, as well as the tubes, valves, pumps, and timers required to provide fluid circulation, nutrient addition, and waste water elimination.

13. The vessel of claim 4 further including a combination of sensors for measuring vessel attitude, motion, depth of operation and wave height and impact time, wherein the means to measure pitch, roll and yaw angle of the vessel is a fast-response, angle calibrated gyroscope or pendulum hereinafter referred to as pitch angle, roll angle and yaw angle sensors, the means to measure course is a time-average angle calibration gyro or magnetic compass hereinafter referred to as the course sensor, the means to measure depth is a calibrated float or pressure depth gauge hereinafter referred to as the depth sensor, the means to measure wave height, vertical wave acceleration and impact time is a calibrated float hanging from a projecting pole or a sound transmitting range sensor or a laser range sensor hereinafter referred to as the wave height, vertical acceleration and impact time sensor.

14. The vessel of claim 13, further including, in combination, a set of controllable surface drivers comprising:

first, a driver having a response time which is long with respect to normal vessel oscillations and which controls the angle of the sea-elevator and responds to the long time average of the pitch angle sensor with a trailing edge down control if the average pitch error is nose up, and up control if the average pitch error is nose down;

second, a driver having a response time which is short with respect to normal vessel oscillations and which controls the angle of the sea elevator and responds to the pitch angle and wave height and impact time sensors with a trailing edge down control in advance of the wave impact, the lead time determined empirically for vessel inertia, when the anticipated pitch error of the vessel is nose up and up control when the anticipated pitch error is nose down, said control magnitude average being limited over long times by the long response time control;

third, a driver having a response time which is long with respect to normal vessel motions and which controls the angle of the sea ailerons and responds to the long time average of the roll angle sensor reading with a right trailing edge down control when the average roll angle reading shows a clockwise roll error from local level, and right up control when the reading shows a counterclockwise roll error;

fourth, a driver having a response time which is short with respect to normal vessel oscillations and which controls the angle of the sea-ailerons and responds to the roll angle and wave height and impact time sensors with a right sea-aileron trailing edge down control in advance of wave impact, the lead time being determined empirically for vessel inertia, when the anticipated roll error is clockwise from local level, and right up when the anticipated roll error is counterclockwise, said control magnitude average being limited over long time by the long response time control;

fifth, a driver having a response time which is long with respect to normal vessel oscillations and which controls the angle of the sea-rudder and responds to the time average course sensor with a trailing edge right control if the average course reading shows a left turn error, and left if the reading shows a right turn error;

sixth, a driver having a response time which is short with respect to normal vessel oscillations and which controls the angle of the sea-rudder and responds to the yaw angle and wave height and impact time sensors with a trailing edge right control in advance of wave impact, the lead time being determined empirically for vessel inertia, if the anticipated yaw angle error is a left turn, and trailing edge left if the anticipated error is a right turn, said control magnitude average being limited over long times by the long response time control;

seventh, a driver having response time which is long with respect to normal vessel oscillations and which controls the angle of the sea-flap and responds to the long time average of the depth sensor with a trailing edge up control if the average sea level is above half way between the upper and lower hulls, and up control if the average sea level is below half way, eighth, a driver having a response time which is short with respect to normal vessel oscillations and which controls the angle of the sea-flap and responds to the vertical acceleration and wave height and impact time sensors with a trailing edge down control in advance of wave impact, the lead time being determined empirically for vessel inertia, if the vertical acceleration estimate shows an anticipated down acceleration error, and up control if the anticipated acceleration error is up, said control magnitude being limited over long times by the long response time control.

15. The vessel of claim 4, further including a combination of drivers for the controllable vanes that operate such that the trailing edge of the sea-flap is moved down or up to provide up or down acceleration of the vessel without need for change of vessel pitch, the trailing edge of the sea-elevator is moved up or down to provide nose down or nose up pitch angle change, the trailing edge of the sea-rudder is moved left or right to provide nose left or nose right yaw angle change, the trailing edge of the right sea-aileron is moved down or up to provide counterclockwise or clockwise roll change with the left sea-aileron operating in the opposite fashion.

16. The vessel of claim 5 further including a means of converting natural energy into storable energy wherein the combination of propulsive energy means and the energy conversion means is used to generate and store excess energy as hydrogen and oxygen in tanks during times of high energy harvest conditions and then, during times of low energy harvest conditions, a portion of the stored energy is reconverted into propulsive energy to aid in travel to areas with high energy harvest conditions, the remainder being sold for profit.

17. The vessel of claim 6, wherein a heat engine and an evaporative desalination unit are provided in combination within the vessel, said heat engine being operated by passing the heated fluid from the cooling tube of the focussing solar radiation collector through the heat engine, thus converting the collected solar heat to mechanical energy; and said evaporative desalination unit being operated by passing the heated fluid from the heat engine through the evaporator filled with seawater and afterwards condensing the vapor to obtain fresh water.

18. A vessel adapted for operating at the surface of the ocean, said vessel comprising: a first hull and a second hull, said first hull being vertically aligned with said second hull, said first hull to be fully submerged and said second hull to be fully unsubmerged; streamlined struts coupling said first hull and said second hull together; fixed and moveable lift and stabilization means coupled to said first hull for operating said vessel at near neutral buoyancy; and lift means adjusted to operate said vessel at a depth so that the average waterline is approximately halfway between said first hull and said second hull, thus providing a small vessel area at the waterline even when the overall vessel displacement is large; and further including, in combination, at least one sail and a vertical axis wind turbine, wherein said sail is coupled to the second hull in front of the wind turbine, and angled to deflect wind from the side or rear of the vessel into the turbine for improved efficiency, and at the same time provide forward thrust to the vessel by reaction on said sails of the deflected wind, said forward thrust giving propulsion which can be used either to provide velocity to the vessel, or to provide mechanical energy by use of the wind turbine at the cost of reduced vessel velocity.

* * * * *